(12) United States Patent
Hayashi

(10) Patent No.: US 9,164,675 B2
(45) Date of Patent: Oct. 20, 2015

(54) ELECTRONIC DEVICE AND STORAGE MEDIUM

(75) Inventor: Tetsuya Hayashi, Hanno (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 224 days.

(21) Appl. No.: 13/347,874

(22) Filed: Jan. 11, 2012

(65) Prior Publication Data

US 2012/0182325 A1    Jul. 19, 2012

(30) Foreign Application Priority Data

Jan. 13, 2011   (JP) ................................ 2011-004547

(51) Int. Cl.
    *G06F 3/041*      (2006.01)
    *G09G 5/00*      (2006.01)
    *G06F 3/0488*      (2013.01)

(52) U.S. Cl.
    CPC .................................. *G06F 3/04883* (2013.01)

(58) Field of Classification Search
    CPC . G06F 3/0485; G06F 1/1626; G06F 3/04855; G06F 3/04865; G06F 3/0487; G06F 3/044; G06F 3/04875; G06F 3/045; G09G 5/346; G09G 5/14
    USPC ........................... 345/173–178, 684; 715/863
    See application file for complete search history.

(56) References Cited

U.S. PATENT DOCUMENTS

| | | | |
|---|---|---|---|
| 6,989,815 | B2 | 1/2006 | Liang et al. |
| 6,995,745 | B2 | 2/2006 | Boon et al. |
| 7,071,915 | B2 | 7/2006 | Liang et al. |
| 7,330,176 | B2 | 2/2008 | Liang et al. |
| 7,333,088 | B2 | 2/2008 | Boon et al. |
| 7,342,569 | B2 | 3/2008 | Liang et al. |
| 7,355,620 | B2 | 4/2008 | Ikehata et al. |
| 7,430,008 | B2 | 9/2008 | Ambiru et al. |
| 2004/0046886 | A1 | 3/2004 | Ambiru et al. |

(Continued)

FOREIGN PATENT DOCUMENTS

| | | |
|---|---|---|
| CN | 101162420 A | 4/2008 |
| CN | 101504585 A | 8/2009 |

(Continued)

OTHER PUBLICATIONS

Japanese Office Action dated Apr. 23, 2013 (and English translation thereof) in counterpart Japanese Application No. 2011-004547.

(Continued)

*Primary Examiner* — Xiao Wu
*Assistant Examiner* — Todd Buttram
(74) *Attorney, Agent, or Firm* — Holtz, Holtz, Goodman & Chick PC

(57) ABSTRACT

In the present invention, various control can be actualized by a simple operation when display content is controlled based on a touch operation.

When a slide operation is performed in which a finger or the like is moved on a touch sensor 8 while touching it, and the pattern of the slide operation determined based on the movement directions of the slide operation is a predetermined pattern in which the finger or the like is initially moved in one direction, and after being temporarily stopped, moved in a different direction, a control section 1 performs image scrolling based on the predetermined pattern, as control of display content displayed on a display section 7.

18 Claims, 8 Drawing Sheets

(56) References Cited

U.S. PATENT DOCUMENTS

| | | | |
|---|---|---|---|
| 2004/0046887 A1 | 3/2004 | Ikehata et al. | |
| 2008/0046425 A1 | 2/2008 | Perski | |
| 2008/0048978 A1* | 2/2008 | Trent et al. | 345/157 |
| 2008/0079692 A1 | 4/2008 | Liang et al. | |
| 2008/0094370 A1 | 4/2008 | Ording et al. | |
| 2008/0109763 A1* | 5/2008 | Lee | 715/856 |
| 2008/0270419 A1* | 10/2008 | Watanabe | 707/10 |
| 2009/0008161 A1* | 1/2009 | Jones et al. | 178/18.06 |
| 2009/0040179 A1 | 2/2009 | Lee et al. | |
| 2009/0259969 A1* | 10/2009 | Pallakoff | 715/808 |
| 2010/0056221 A1* | 3/2010 | Park | 455/566 |
| 2010/0079501 A1 | 4/2010 | Ikeda et al. | |
| 2010/0104134 A1* | 4/2010 | Wang et al. | 382/103 |
| 2010/0175018 A1 | 7/2010 | Petschnigg et al. | |
| 2010/0295781 A1* | 11/2010 | Alameh et al. | 345/158 |
| 2010/0333044 A1 | 12/2010 | Kethireddy | |
| 2011/0039602 A1* | 2/2011 | McNamara et al. | 455/566 |
| 2011/0041102 A1* | 2/2011 | Kim | 715/863 |
| 2011/0090255 A1* | 4/2011 | Wilson et al. | 345/647 |
| 2011/0126148 A1* | 5/2011 | Krishnaraj et al. | 715/784 |
| 2011/0169764 A1 | 7/2011 | Miyoshi | |
| 2011/0302518 A1* | 12/2011 | Zhang | 715/773 |
| 2011/0320978 A1* | 12/2011 | Horodezky et al. | 715/823 |
| 2012/0011437 A1* | 1/2012 | James et al. | 715/702 |
| 2012/0075203 A1* | 3/2012 | Lin et al. | 345/173 |
| 2012/0080521 A1* | 4/2012 | Brown et al. | 235/382 |
| 2012/0256863 A1* | 10/2012 | Zhang et al. | 345/173 |
| 2012/0284674 A1* | 11/2012 | Geng et al. | 715/863 |
| 2013/0006957 A1* | 1/2013 | Huang et al. | 707/706 |
| 2013/0007793 A1* | 1/2013 | Anthru et al. | 725/14 |
| 2013/0268557 A1* | 10/2013 | Pickersgill et al. | 707/769 |

FOREIGN PATENT DOCUMENTS

| | | |
|---|---|---|
| CN | 101510141 A | 8/2009 |
| CN | 101639739 A | 2/2010 |
| JP | 5-127819 A | 5/1993 |
| JP | 2003-338975 A | 11/2003 |
| JP | 2004-104594 A | 4/2004 |
| JP | 2005-502965 A | 1/2005 |
| JP | 2005-44036 A | 2/2005 |
| JP | 2005-228353 A | 8/2005 |
| JP | 2005-234291 A | 9/2005 |
| JP | 2006-277314 A | 10/2006 |
| JP | 2009-003950 A | 1/2009 |
| JP | 2010-500683 A | 1/2010 |
| JP | 2010-503126 A | 1/2010 |
| JP | 2010-086230 A | 4/2010 |
| JP | 2011-008768 A | 1/2011 |
| JP | 2012-514811 A | 6/2012 |
| KR | 10-0758288 B1 | 9/2007 |
| KR | 10-2009-0102727 A | 9/2009 |
| WO | WO 2010/055895 A1 | 5/2010 |
| WO | WO 2010/080258 A2 | 7/2010 |

OTHER PUBLICATIONS

Japanese Office Action dated Jul. 2, 2013 (and English translation thereof) in counterpart Japanese Application No. 2011-004547.
Korean Office Action dated Oct. 31, 2013 (and English translation thereof) in counterpart Korean Application No. 10-2012-0003505.
Chinese Office Action dated Dec. 18, 2013 (and English translation thereof) in counterpart Chinese Application No. 201210006305.4.
Chinese Office Action dated Aug. 22, 2014, issued in counterpart Chinese Application No. 201210006305.4.

* cited by examiner

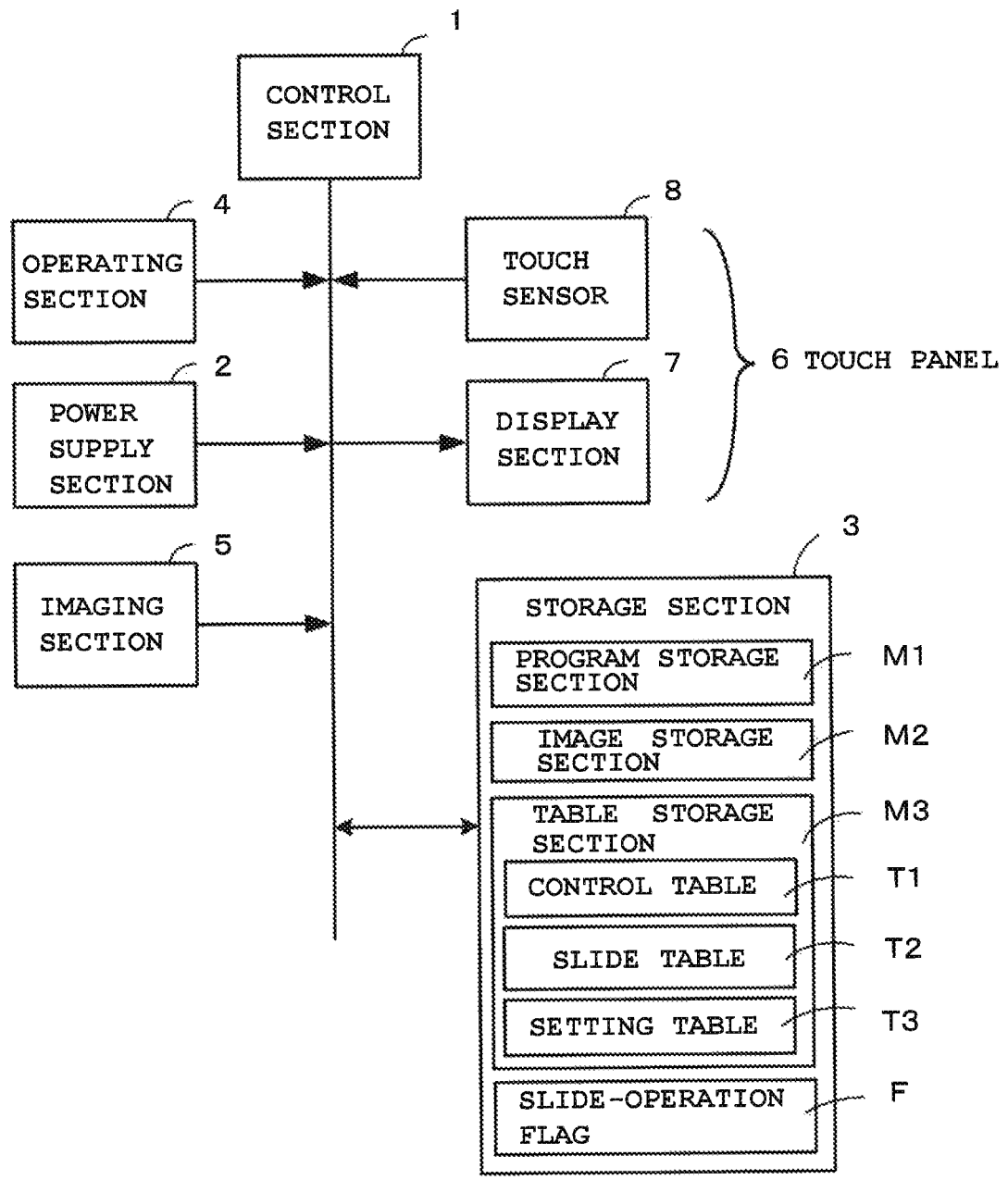

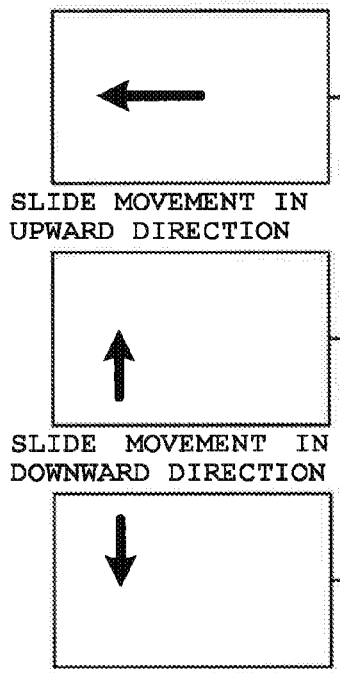
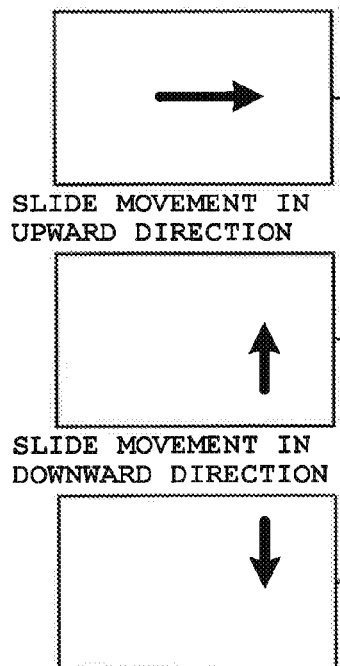

FIG. 3A
IMAGE SCROLLING IN UPWARD DIRECTION

SLIDE MOVEMENT IN OPPOSITE DIRECTION

↓

SLIDE MOVEMENT IN LEFTWARD DIRECTION

←

SLIDE MOVEMENT IN RIGHTWARD DIRECTION

→

TEMPORARY STOP

○

SLIDE MOVEMENT IN IMAGE-SCROLLING DIRECTION

↑

FIG. 3B
IMAGE SCROLLING IN DOWNWARD DIRECTION

SLIDE MOVEMENT IN OPPOSITE DIRECTION

↑

SLIDE MOVEMENT IN LEFTWARD DIRECTION

←

SLIDE MOVEMENT IN RIGHTWARD DIRECTION

→

TEMPORARY STOP

○

SLIDE MOVEMENT IN IMAGE-SCROLLING DIRECTION

CONTROL TABLE T1

| ID | TYPE | DETAILS | | | |
|---|---|---|---|---|---|
| | | A | B | C | D |
| 1 | CHANGE NUMBER OF IMAGES TO BE SCROLLED | 1 IMAGE | 2 IMAGES | 3 IMAGES | 4 IMAGES |
| 2 | CHANGE IMAGE-SCROLLING SPEED | 1 SEC/IMAGE | 2 SEC/IMAGE | 3 SEC/IMAGE | 4 SEC/IMAGE |
| 3 | CHANGE IMAGE-SWITCHING EFFECT DURING IMAGE SCROLLING | NONE | SLIDE-IN | CHECKERBOARD | BLIND |
| 4 | CHANGE IMAGE-SCROLLING UNIT | ALL IMAGES | | HEAD-OF-FOLDER ONLY | EARLIEST-TIMESTAMP-OF-DAY ONLY |

FIG. 4B

SLIDE TABLE T2

| TYPE | DETAILS | | | |
|---|---|---|---|---|
| | A | B | C | D |
| MOVEMENT AMOUNT | LESS THAN 1/3 OF SCREEN | 1/3 TO 1/2 OF SCREEN | 1/2 TO 2/3 OF SCREEN | MORE THAN 2/3 OF SCREEN |
| MOVEMENT SPEED | LESS THAN 0.33 SEC/MOVEMENT AMOUNT | 0.33 TO 0.66 SEC/MOVEMENT AMOUNT | 0.66 TO 1 SEC/MOVEMENT AMOUNT | MORE THAN 1 SEC/MOVEMENT AMOUNT |
| STOP DURATION | LESS THAN 0.5 SEC | 0.5 TO 1 SEC | 1 TO 1.5 SEC | MORE THAN 1.5 SEC |

FIG. 5A

SETTING TABLE T3

| TYPE | SETTING EXAMPLE (1) SETTING ID | SETTING EXAMPLE (2) SETTING ID |
|---|---|---|
| AMOUNT OF INITIAL MOVEMENT IN OPPOSITE DIRECTION | 1 | 1 |
| SPEED OF INITIAL MOVEMENT IN OPPOSITE DIRECTION | | |
| AMOUNT OF LATTER MOVEMENT IN FORWARD DIRECTION | 2 | 2 |
| SPEED OF LATTER MOVEMENT IN FORWARD DIRECTION | 3 | 3 |
| STOP DURATION DURING DIRECTION CHANGE | 4 | |
| AMOUNT OF INITIAL MOVEMENT IN 90° FORWARD-ROTATION DIRECTION | | 4 |
| SPEED OF INITIAL MOVEMENT IN 90° FORWARD-ROTATION DIRECTION | | |
| AMOUNT OF INITIAL MOVEMENT IN 90° COUNTER-ROTATION DIRECTION | | |
| SPEED OF INITIAL MOVEMENT IN 90° COUNTER-ROTATION DIRECTION | | |

| | SLIDE OPERATION FLAG |
|---|---|
| 0 | OTHER STATE |
| 1 | INITIAL SLIDE MOVEMENT IN PROGRESS |
| 2 | TEMPORARY STOP |
| 3 | LATTER SLIDE MOVEMENT IN PROGRESS |

ELECTRONIC DEVICE AND STORAGE MEDIUM

CROSS-REFERENCE TO RELATED APPLICATION

This application is based upon and claims the benefit of priority from the prior Japanese Patent Application No. 2011-004547, filed Jan. 13, 2011, the entire contents of which is incorporated herein by reference.

BACKGROUND OF THE INVENTION

1. Field of the Invention

The present invention relates to an electronic device including a touch-input section which detects a touch operation and a display section, and a storage medium.

2. Description of the Related Art

In an electronic device (such as a digital camera or a mobile phone) that includes a touch panel for inputting commands and data by touching with a finger or the like, the touch panel is generally used to execute operations based on gesture performed on the touch panel, in addition to being used as a software keyboard. For example, a technology such as that described in Japanese Patent Application Laid-Open (Kokai) Publication No. 2003-338975 has been disclosed in the past in which display content is controlled based on an operation mode and the pattern of a "sliding operation" performed on a touch panel, whereby display control such as image-scrolling or screen-scrolling for an enlarged image is performed.

However, in the conventional technology described above, although display control based on the pattern type of a "sliding operation" can be actualized simply by the pattern being changed, the display control is associated with a plurality of pattern types individually, and therefore the types of the display control are limited to the number of the pattern types, and detailed control and fine control cannot be performed within the same types of display control.

An object of the present invention is to actualize various control through a simple operation when display content is controlled based on a touch operation.

SUMMARY OF THE INVENTION

In order to achieve the above-described object, in accordance with one aspect of the present invention, there is provided an electronic device comprising: a touch-input section which detects a touch operation; a display section; a movement detecting section which detects movement directions of a slide operation on the touch-input section while touching the touch-input section, when the slide operation is performed; a pattern determining section which determines a pattern of the slide operation based on the movement directions detected by the movement detecting section, wherein the pattern determining section is configured to detect a predetermined pattern in which the touch operation is performed in an order of (i) movement in a first direction and (ii) movement in a second direction that differs from the first direction; and a display control section which controls display content displayed on the display section based on the predetermined pattern, when the pattern determining section detects the predetermined pattern.

In accordance with another aspect of the present invention, there is provided a non-transitory computer-readable storage medium having stored thereon a program that is executable by a computer, the program being executable by the computer to perform functions comprising: processing for detecting movement directions of a slide operation on a touch-input section while touching the touch-input section, when the slide operation is performed; processing for determining a pattern of the slide operation based on the detected movement directions, wherein a predetermined pattern is detected in which the touch operation is performed in an order of (i) movement in a first direction and (ii) movement in a second direction that differs from the first direction; and processing for controlling display content displayed on a display section based on the predetermined pattern, when the predetermined pattern is detected.

According to the present invention, various control through a simple operation can be performed when display content is controlled based on a touch operation, whereby the user-friendliness and the operability are enhanced. Therefore, it is practically useful.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 1 is a block diagram showing basic components of a digital camera that is an example of an electronic device to which the present invention has been applied;

FIG. 2A is a diagram showing a list of slide-operation patterns in which image scrolling can be performed when image scrolling is performed based on a slide operation performed on a touch sensor 8;

FIG. 2B is a diagram showing another list of slide-operation patterns in which image scrolling can be performed when image scrolling is performed based on a slide operation performed on the touch sensor 8;

FIG. 3A is a diagram showing another list of slide-operation patterns in which image scrolling can be performed when image scrolling is performed based on a slide operation performed on the touch sensor 8, as in the cases of FIG. 2A and FIG. 2B;

FIG. 3B is a diagram showing another list of slide-operation patterns in which image scrolling can be performed when image scrolling is performed based on a slide operation performed on the touch sensor 8, as in the cases of FIG. 2A and FIG. 2B;

FIG. 4A is a diagram for explaining a control table T1 in a table storage section M3;

FIG. 4B is a diagram for explaining a slide table T2 in the table storage section M3;

FIG. 5A is a diagram for explaining a setting table T3 in the table storage section M3;

FIG. 5B is a diagram for explaining a slide-operation flag F in a storage section 3;

DETAILED DESCRIPTION OF THE PREFERRED EMBODIMENT

Figure 6:
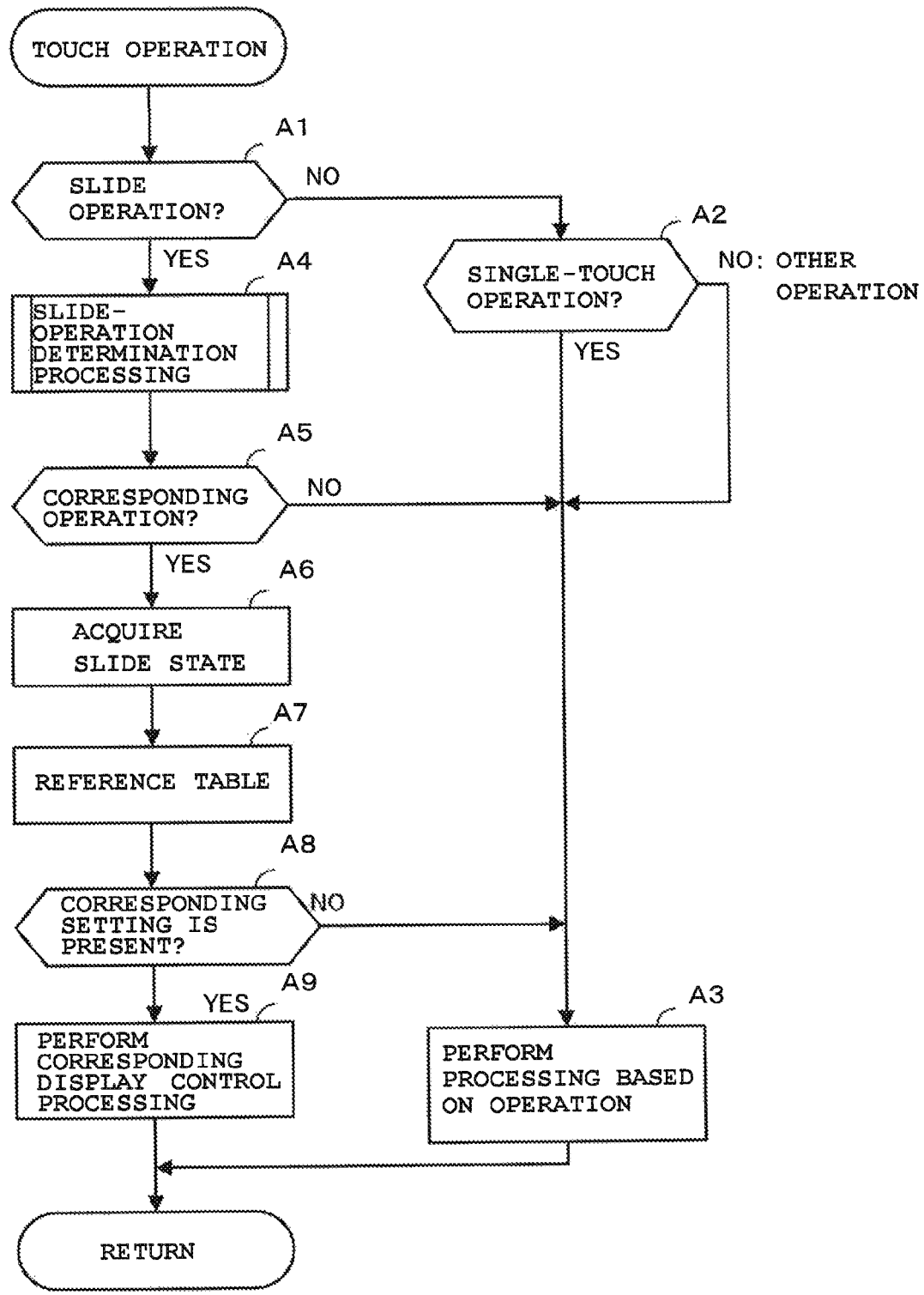
FIG. 6 is a flowchart of operations that are started in response to a touch operation performed on the touch sensor 8.

An embodiment of the present invention will be described with reference to FIG. 1 to FIG. 8.

FIG. 1 is a block diagram showing basic components of a digital camera that is an example of an electronic device to which the present invention has been applied.

This digital camera (imaging device), which is a compact camera capable of capturing video images in addition to still images, is provided with a touch-input function enabling input through touch operations and has a control section 1 serving as its core. The control section 1 (movement detecting section, pattern determining section, and display control section), which is provided with a central processing unit (CPU), a memory, and the like (not shown), operates by receiving power supply from a power supply section (secondary battery) 2, and controls the overall operations of the digital camera (hereinafter, referred to as "camera") in accordance with various programs stored in a storage section 3.

The storage section 3 is, for example, structured to include a read-only memory (ROM), a flash memory, or the like. In addition, a program storage section M1, an image storage section M2, a table storage section M3, and a work area are included in this storage section 3. The program storage section M1 stores programs for actualizing the present embodiment based on operation procedures shown in FIG. 6 to FIG. 8 described hereafter, various applications, and the like, and the image storage section M2 stores captured images (still images and video images) sorted into folders or the like. The table storage section M3 stores various tables, and the work area temporarily stores various information (slide-operation flag F, timer, and the like, described hereafter) required to operate the camera.

When a touch operation (slide operation) is performed in which a finger or the like is moved on a touch sensor 8 while touching it, control (display control) is performed on display content displayed on a display section 7 based on the slide state of the slide operation (such as slide-operation pattern, movement direction, movement amount, and movement speed). The table storage section M3 has a control table T1, a slide table T2, and a setting table T3 described hereafter, and stores information regarding which display control is performed at this time. This storage section 3 may be, for example, configured to include a detachable portable memory (recording medium) such as a secure digital (SD) card or an integrated circuit (IC) card. Alternatively, in a case where the storage section 3 is connected to a network by a communication function (not shown), it may be configured to include a storage area on a predetermined external server-side.

An operating section 4 includes various press-button-type keys that are used to perform a shutter operation, a video-capturing operation, an operation for setting imaging conditions such as exposure and shutter speed, a playback operation for giving an instruction to replay a captured image, and the like (not shown), and the control section 1 performs image-capture processing, imaging-condition setting, playback processing, data-input processing, and the like, as processing based on input operation signals from the operating section 4. An imaging section 5 constitutes a camera section that is capable of capturing a high-definition image of a subject by forming an image of the subject from an optical lens (not shown) in an image sensor (such as a charge-coupled device [CCD] or a complementary metal-oxide semiconductor [CMOS]), and can capture video images in addition to still images.

A touch panel 6 constitutes a touch-input section (touch screen) that detects a point on which a touch operation is performed by a finger or the like and inputs the coordinate data of the point, as the above-described touch-input function. The display section 7 and the touch sensor 8 are included in this touch panel 6. Note that, among various methods such as a capacitance method, a resistive-film method, an electromagnetic-induction method, and a piezoelectric method, the capacitance method which has excellent lightweightness, light transmission, durability, and the like is used in the touch sensor 8. However, the other methods may also be used. The display section 7 is, for example, a high-definition liquid crystal display or an organic electroluminescent (EL) display having a screen with an uneven aspect ratio (width-to-height ratio of 4:3), and displays function names as software keys. In addition, the display section 7 functions as a view-finder screen (monitor screen) for displaying a captured image (through-image: live-view image) and a playback screen for displaying a stored image.

The touch sensor 8 constituting the touch panel 6 senses that the touch screen is being touched (approached or contacted) by sensing a change in capacitance. This transparent touch sensor 8 is arranged to be layered on the overall display surface of the display section 7. When a touch operation (slide operation) is performed in which a finger or the like is moved on the touch sensor 8 while touching it, the control section 1 determines the slide state (such as slide-operation pattern, and movement direction, movement amount, and movement speed of each slide movement) indicating the type of the operation being performed, and controls display content being displayed on the display section 7 based on the slide state. In the present embodiment, the control section 1 performs image scrolling as the control (display control) of the display content being displayed on the display section 7.

FIG. 2A to FIG. 3B are diagrams showing lists of slide-operation patterns in which image scrolling can be performed when the image scrolling of display content (image) displayed on the display section 7 is performed based on a slide operation performed on the touch sensor 8.

That is, this slide-operation pattern, in which image scrolling can be performed, is a pattern in which a finger or the like is initially moved substantially linearly in one direction, and after being temporarily stopped, moved substantially linearly in a different direction. Note that "substantially linearly" herein indicates that, even if the movement direction of the finger or the like slightly changes during its slide movement, the movement is recognized as being in a slide-operation pattern as long as it is linear as a whole. In addition, "temporarily stopped" herein indicates a state in which the movement of the finger or the like is stopped while still touching the touch sensor 8. Moreover, "moved in a different direction" herein indicates that, after the finger or the like is initially moved (initial slide movement) and then temporarily stopped, the movement direction is changed and the finger or the like is moved in a different direction (latter slide movement).

FIG. 2A is a diagram showing slide-operation patterns for giving an instruction to perform the image scrolling of display content displayed on the display section 7 in the rightward direction in the drawing, and image scrolling is performed on condition that any one of the following three types of operation patterns has been performed. A first operation pattern is a pattern in which a finger or the like is initially moved substantially linearly in one direction (direction opposite to an image-scrolling direction: leftward direction in FIG. 2A), and after being temporarily stopped, moved substantially linearly in a different direction (image-scrolling direction: forward direction: rightward direction in FIG. 2A). A second operation pattern is a pattern in which a finger or the like is initially moved substantially linearly in one direction (direction rotated from an image-scrolling direction by 90° in a counter-clockwise direction: counter-rotation direction: upward direction in FIG. 2A), and after being temporarily stopped, moved substantially linearly in a different direction (image-scrolling direction: rightward direction in FIG. 2A). A third operation pattern is a pattern in which a finger or the like is initially moved substantially linearly in one direction (direction rotated from an image-scrolling direction by 90° in a clockwise direction: forward-rotation direction: downward direction in FIG. 2A), and after being temporarily stopped, moved substantially linearly in a different direction (image-scrolling direction: rightward direction in FIG. 2A).

FIG. 2B is a diagram showing slide-operation patterns for giving an instruction to perform the image scrolling of display content displayed on the display section 7 in the leftward direction in the drawing, and image scrolling is performed on condition that any one of the following three types of operation patterns has been performed. A first operation pattern is a pattern in which a finger or the like is initially moved substantially linearly in one direction (opposite direction: rightward direction in FIG. 2B), and after being temporarily stopped, moved substantially linearly in a different direction (forward direction: leftward direction in FIG. 2B). A second operation pattern is a pattern in which a finger or the like is initially moved substantially linearly in one direction (90° forward-rotation direction: upward direction in FIG. 2B), and after being temporarily stopped, moved substantially linearly in a different direction (forward direction: leftward direction in FIG. 2B). A third operation pattern is a pattern in which a finger or the like is initially moved substantially linearly in one direction (90° counter-rotation direction: downward direction in FIG. 2B), and after being temporarily stopped, moved substantially linearly in a different direction (forward direction: leftward direction in FIG. 2B).

Similarly, FIG. 3A is a diagram showing slide-operation patterns for giving an instruction to perform the image scrolling of display content displayed on the display section 7 in the upward direction in the drawing, and image scrolling is performed on condition that any one of the following three types of operation patterns has been performed. A first operation pattern is a pattern in which a finger or the like is initially moved substantially linearly in one direction (opposite direction: downward direction in FIG. 3A), and after being temporarily stopped, moved substantially linearly in a different direction (forward direction: upward direction in FIG. 3A). A second operation pattern is a pattern in which a finger or the like is initially moved substantially linearly in one direction (90° counter-rotation direction: leftward direction in FIG. 3A), and after being temporarily stopped, moved substantially linearly in a different direction (forward direction: upward direction in FIG. 3A). A third operation pattern is a pattern in which a finger or the like is initially moved substantially linearly in one direction (90° forward-rotation direction: rightward direction in FIG. 3A), and after being temporarily stopped, moved substantially linearly in a different direction (forward direction: upward direction in FIG. 3A).

FIG. 3B is a diagram showing slide-operation patterns for giving an instruction to perform the image scrolling of display content displayed on the display section 7 in the downward direction in the drawing, and image scrolling is performed on condition that any one of the following three types of operation patterns has been performed. A first operation pattern is a pattern in which a finger or the like is initially moved substantially linearly in one direction (opposite direction: upward direction in FIG. 3B), and after being temporarily stopped, moved substantially linearly in a different direction (forward direction: downward direction in FIG. 3B). A second operation pattern is a pattern in which a finger or the like is initially moved substantially linearly in one direction (90° forward-rotation direction: leftward direction in FIG. 3B), and after being temporarily stopped, moved substantially linearly in a different direction (forward direction: downward direction in FIG. 3B). A third operation pattern is a pattern in which a finger or the like is initially moved substantially linearly in one direction (90° counter-rotation direction: rightward direction in FIG. 3B), and after being temporarily stopped, moved substantially linearly in a different direction (forward direction: downward direction in FIG. 3B).

FIG. 4A and FIG. 4B are diagrams for explaining a control table T1 and a slide table T2 in the table storage section M3.

FIG. 4A is a diagram showing the contents of the control table T1. The control table T1 stores the details of display control indicating what type of display control is performed, in which the specific details of control are stored for each type of the display control. That is, the control table T1 has an "ID" field, a "type" field, and a "details" field. In the "type" field, "change number of images to be scrolled", "change image-scrolling speed", "change image-switching effect during image scrolling", and "change image-scrolling unit" are stored corresponding to "1" to "4" in the "ID" field. "Change number of images to be scrolled" indicates change in the number of images to be scrolled per single operation pattern based on a slide state when a slide operation of a predetermined pattern shown in FIG. 2A to FIG. 3B is performed, and "1 image", "2 images", "3 images", and "4 images" are stored corresponding to "A", "B", "C", and "D" in its "details" field.

"Change image-scrolling speed" indicates change in image-scrolling speed based on a slide state when a slide operation of a predetermined pattern shown in FIG. 2A to FIG. 3B is performed, and "1 sec/image", "2 sec/image", "3 sec/image", and "4 sec/image" are stored corresponding to "A", "B", "C", and "D" in its "details" field. "Change image-switching effect during image scrolling" indicates change in a display effect that is added and applied to image-switching during image scrolling based on a slide state when a slide operation of a predetermined pattern shown in FIG. 2A to FIG. 3B is performed, and "none", "slide-in", "checkerboard", and "blind" are stored corresponding to "A", "B", "C", and "D" in its "details" field. Note that "None" indicates that a display effect is not applied.

"Change image-scrolling unit" indicates change in the type of image-scrolling unit based on a slide state when a slide operation of a predetermined pattern shown in FIG. 2A to FIG. 3B is performed, and "all images", "all images", "head-of-folder only", and "earliest-timestamp-of-day only" are stored corresponding to "A", "B", "C", and "D" in its "details" field. This image-scrolling unit indicates that image scrolling is performed in units of image, folder, day, or the like. For example, "all images" indicates that a series of images are sequentially scrolled in image units from the first image of the series. "Head-of-folder only" indicates that, when a series of images have been discretely stored in a plurality of folders, only images stored in the head position of each folder are read out as predetermined images, and sequentially scrolled. "Earliest-timestamp-of-day only" indicates that, among a series of images being managed in units of days, only images having the earliest time (earliest timestamp) of each day are read out, and sequentially scrolled.

FIG. 4B is a diagram showing the contents of the slide table T2. The slide table T2 has a "type" field and a "details" field, and stores slide states. In the "type" field, "movement amount", "movement speed", and "stop duration" are stored as the types of slide state. In the "details" field, "A", "B", "C", and "D" are stored as the details of the slide state. That is, "movement amount" indicates the amount of movement in an initial slide movement or a latter slide movement made by a slide operation of a predetermined pattern shown in FIG. 2A to FIG. 3B, with reference to the length of the screen. "Less than ⅓ of screen", "⅓ to ½ of screen", "½ to ⅔ of screen", "more than ⅔ of screen" are stored corresponding to "A", "B", "C", and "D" in its "details" field. In this embodiment, when a slide movement is made in a horizontal direction, the length of the screen in the horizontal direction is used as a reference for the movement amount. When a slide movement is made in a vertical direction, the length of the screen in the vertical direction is used as a reference for the movement amount. However, the same length may be used as the reference regardless of whether a slide movement has been made in a horizontal direction or a vertical direction.

"Movement speed" indicates the movement speed of an initial slide movement or a latter slide movement expressed in time per unit movement amount, and "less than 0.33 sec/movement amount", "0.33 to 0.66 sec/movement amount", "0.66 to 1 sec/movement amount", and "more than 1 sec/movement amount" are stored corresponding to "A", "B", "C", and "D" in its "details" field. "Stop duration" indicates stop duration (the amount of time slide movement is stopped while a finger or the like is touching the touch panel 6) from when a finger or the like temporarily stops after its initial slide movement to when its latter slide movement is started. This stop duration is expressed in units of seconds, and "less than 0.5 sec", "0.5 to 1 sec", "1 to 1.5 sec", and "more than 0.5 sec" are stored corresponding to "A", "B", "C", and "D" in its "details" field.

FIG. 5A and FIG. 5B are diagrams for explaining the setting table T3 and the slide operation flag F.

FIG. 5A is a diagram showing the contents of the setting table T3. The setting table T3 having a "type" field and a "setting ID" field stores information regarding which type of image scrolling is performed by a slide operation, and the contents of which can be arbitrarily set by user operation. In the "type" field, "amount of initial movement in opposite direction" and "speed of initial movement in opposite direction" are stored as a movement amount and a movement speed for when a finger or the like is moved in a direction opposite to a desired image-scrolling direction during an initial slide movement. In addition, in the "type" field, "amount of latter movement in forward direction" and "speed of latter movement in forward direction" are stored as a movement amount and a movement speed for when a finger or the like is moved in a desired image-scrolling direction (forward direction) during a latter slide movement.

Moreover, in the "type" field, "stop duration during direction change" is stored as stop duration from when a finger or the like temporarily stops after its initial slide movement to when its latter slide movement is started. Furthermore, in the "type" field, "amount of initial movement in 90° forward-rotation direction" and "speed of initial movement in 90° forward-rotation direction" are stored as a movement amount and a movement speed for when a finger or the like is moved in a 90° forward-rotation direction from a desired image-scrolling direction during its initial slide movement. Still further, in the "type" field, "amount of initial movement in 90° counter-rotation direction" and "speed of initial movement in 90° counter-rotation direction" are stored as a movement amount and a movement speed for when a finger or the like is moved in a 90° counter-rotation direction from a desired image-scrolling direction during its initial slide movement. In the "setting ID" field, the "IDs" in the control table T1 are stored as information indicating which type of image scrolling is instructed, which are arbitrarily set by user operation.

That is, in setting example (1) in FIG. 5A, "1" has been set in the "setting ID" field corresponding to "amount of initial movement in opposite direction", which indicates that display control is performed by which the number of images to be scrolled is changed based on the amount of an initial movement in an opposite direction "A" to "D". In addition, "2" has been set in the "setting ID" field corresponding to "speed of latter movement in forward direction", which indicates that display control is performed by which image-scrolling speed is changed based on the speed of a latter movement in a forward direction "A" to "D". Moreover, "3" has been set in the "setting ID" field corresponding to "stop duration during direction change", which indicates that display control is performed by which an image-switching effect during image scrolling is changed based on the stop duration during direction change "A" to "D". Furthermore, "4" has been set in the "setting ID" field corresponding to "amount of initial movement in 90° forward-rotation direction", which indicates that display control is performed by which an image-scrolling unit is changed based on the amount of an initial movement in the 90° forward-rotation direction "A" to "D". Note that blanks in the "setting ID" field where none of "1" to "4" has been set indicates that display control based on the contents of the control table T1 is not performed.

Also, in setting example (2) in FIG. 5A, "1" has been set in the "setting ID" field corresponding to "amount of initial movement in opposite direction", which indicates that display control is performed by which the number of images to be scrolled is changed based on the amount of an initial movement in an opposite direction "A" to "D". In addition, "2" has been set in the "setting ID" field corresponding to "amount of latter movement in forward direction", which indicates that display control is performed by which image-scrolling speed is changed based on the amount of a latter movement in a forward direction "A" to "D". Moreover, as in the case of setting example (1) in FIG. 5A, "3" has been set in the "setting ID" field corresponding to "stop duration during direction change", which indicates that display control is performed by which an image-switching effect during image scrolling is changed based on the stop duration during direction change "A" to "D". Furthermore, "4" has been set in the "setting ID" field corresponding to "amount of initial movement in 90° counter-rotation direction", which indicates that display control is performed by which an image-scrolling unit is changed based on the amount of an initial movement in a 90° counter-rotation direction "A" to "D".

FIG. 5B is a diagram showing the contents of the slide operation flag F. The slide operation flag F stores a flag indicating a current slide state when a slide operation of a predetermined pattern shown in FIG. 2A to FIG. 3B is performed. The value of this slide operation flag F changes to any one of "0", "1", "2", or "3" depending on the slide state. The value "1" of the slide operation flag F indicates a sliding-in-progress state where an initial slide movement is being performed. The value "2" of the slide operation flag F indicates a stopped state where a finger or the like is temporarily stopping after its initial slide movement. The value "3" of the slide operation flag F indicates a sliding-in-progress state where a latter slide movement after a temporary stop is being performed. The value "0" of the slide operation flag F indicates other states (such as a state where a finger or the like is not touching the touch panel 6).

Next, an operation concept of the digital camera according to the present embodiment will be described with reference to the flowcharts shown in FIG. 6 to FIG. 8. Here, each function described in the flowchart is stored in readable program code format, and operations based on these program codes are sequentially performed. Operations based on the above-described program codes transmitted over a transmission medium such as a network can also be sequentially performed. That is, the unique operations of the embodiment can be performed using program and data supplied from an outside source over a transmission medium, in addition to a recording medium.

FIG. 6 is a flowchart of operations that are started in response to a touch operation performed on the touch sensor 8 constituting the touch panel 6. Note that FIG. 6 is a flowchart outlining operations of the characteristic portion of this embodiment from among all of the operations of the digital camera. After exiting the flow in FIG. 6, the procedure returns to the main flow (not shown) of the overall operation.

First, when the user performs a touch operation, the control section 1 determines the type of the touch operation by judging whether or not a slide operation has been performed in which a finger or the like is moved on the touch sensor 8 while touching it (Step A1), and by judging whether or not a single-touch operation has been performed in which a finger or the like taps the touch sensor 8 once (Step A2). When judged that a single-touch operation has been performed (YES at Step A2), the control section 1 performs processing based on the touch operation (Step A3). When judged that an operation other than a slide operation and a single-touch operation (such as a double-tap operation) has been performed (NO at Step A2), in this case as well, the control section 1 performs processing based on the touch operation (Step A3). Then, the control section 1 exits the flow in FIG. 6.

On the other hand, when judged that a slide operation has been performed (YES at Step A1), the control section 1 proceeds to slide-operation determination processing for determining the slide state (Step A4).

Figure 7:
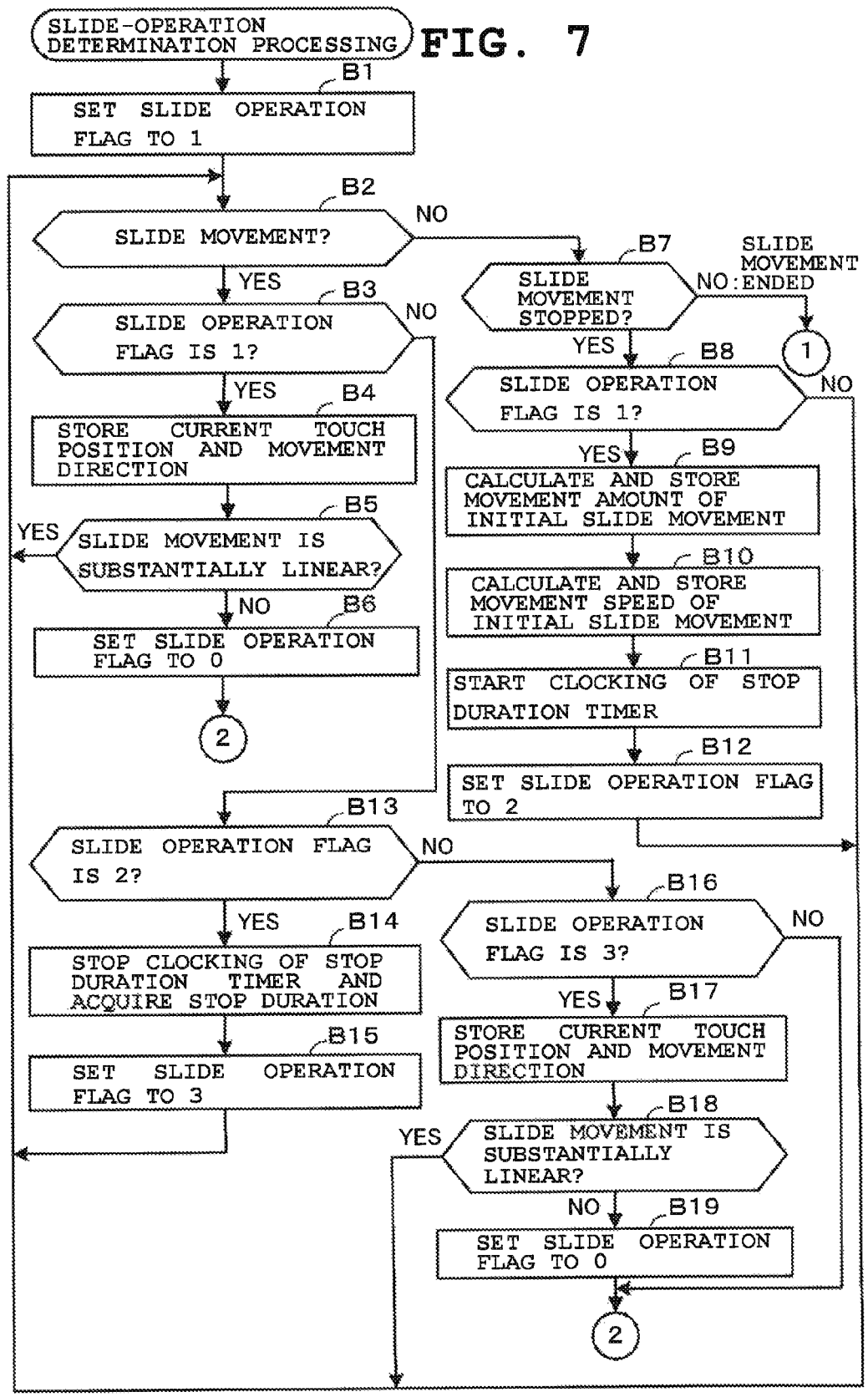
FIG. 7 is a flowchart describing in detail slide-operation determination processing (Step A4 in FIG. 6)
Figure 8:
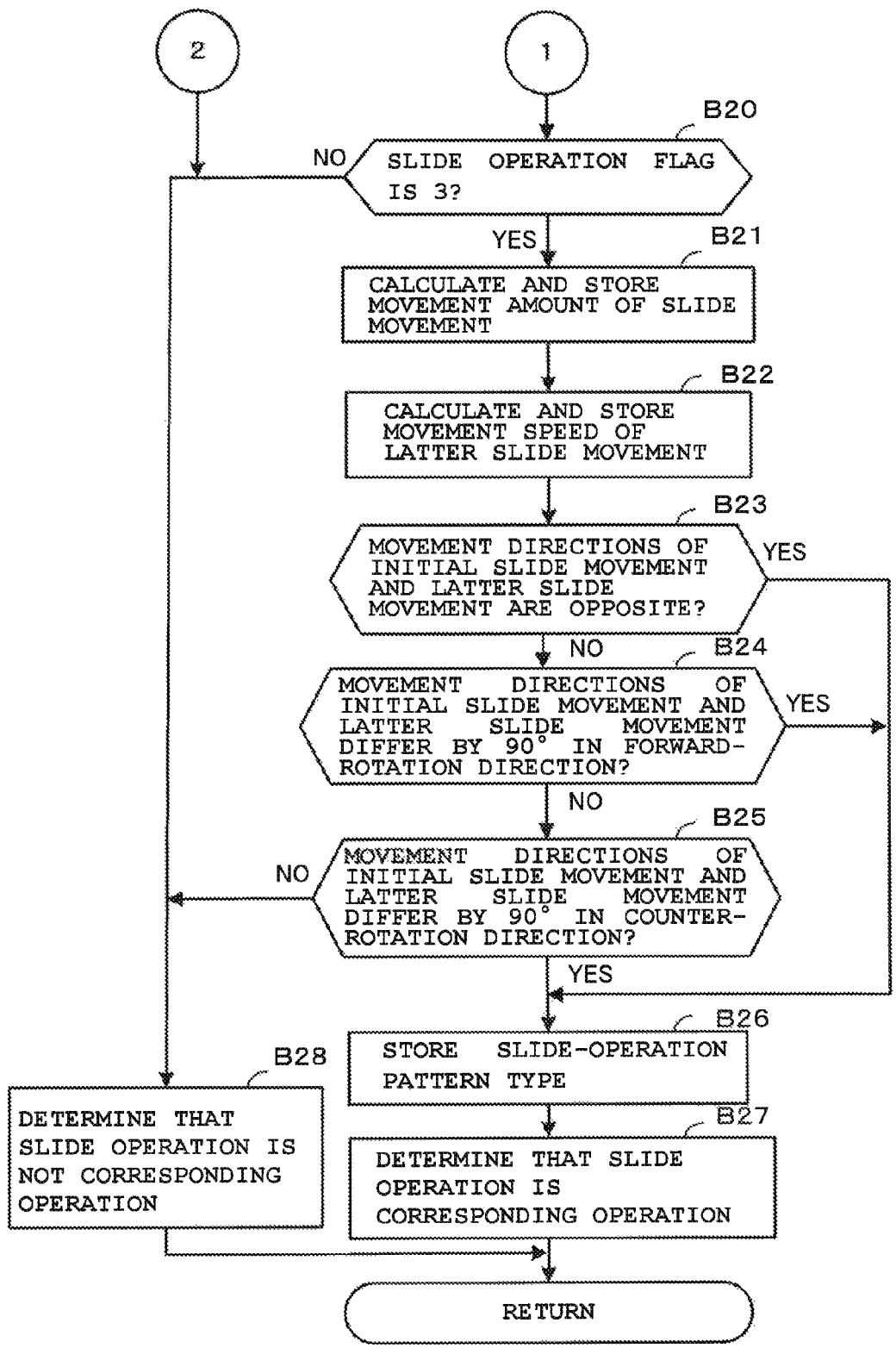
FIG. 8 is a flowchart showing the operations of the slide-operation determination processing which is continuing on from FIG. 7.

FIG. 7 and FIG. 8 are flowcharts describing in detail the slide-operation determination processing (Step A4 in FIG. 6). First, when the control section 1 detects a slide operation, the control section 1 performs processing for setting "1" for the slide operation flag F to indicate that an initial slide movement is being made (Step B1). Next, the control section 1 judges whether or not the slide movement is still being made, based on a detection result from the touch sensor 8 (Step B2). When judged that the slide movement is not being made (NO at Step B2), the control section 1 judges whether or not the finger or the like has stopped its slide movement while still touching the touch sensor 8 (Step B7). Conversely, when judged that the slide movement is still being made (YES at Step B2), the control section 1 judges whether or not the slide operation flag F is "1", or in other words, the initial slide movement is still being made (Step B3).

When judged that the initial slide movement is still being made (YES at Step B3), the control section 1 determines the current touch position and movement direction, and stores the touch position and movement direction in the work area of the storage section 3 (Step B4). Next, the control section 1 judges whether or not the slide movement is being made substantially linearly, based on the movement direction (Step B5). When judged that the slide movement is not being made substantially linearly (NO at Step B5), since this slide operation does not correspond to any of the slide operations of the predetermined patterns shown in FIG. 2A to FIG. 3B, the control section 1 proceeds to subsequent Step B6 and sets the value of the slide operation flag F to "0". Next, the control section 1 proceeds to Step B28 in FIG. 8, and determines that the slide operation does not correspond to any of the slide operations of the predetermined patterns, as a determination result of the slide-operation determination processing. Then, the control section 1 exits the flow in FIG. 7 and FIG. 8.

On the other hand, when judged at Step B5 that the initial slide movement is being made substantially linearly (YES at Step B5 in FIG. 7), the control section 1 returns to the above-described Step B2. Hereafter, Step B4 and Step B5 described above are repeatedly performed as long as the slide operation flag F is "1" and the slide movement is being made. Then, when the slide movement stops (YES at Step B7), the control section 1 judges whether or not the slide operation flag F is "1" (Step B8). Here, because the finger or the like has temporarily stopped sliding after its initial slide movement, the slide operation flag F is "1" (YES at Step B8). Therefore, the control section 1 performs processing for calculating the movement amount of the initial slide movement based on each touch position in the initial slide movement which has been stored in the work area of the storage section 3, and storing the movement amount in the work area of the storage section 3 (Step B9).

Then, after performing processing for calculating the movement speed of the initial slide movement and storing the movement speed in the work area of the storage section 3 (Step B10), the control section 1 starts the clocking operation of a stop timer (measuring section; not shown) to measure the temporary-stop duration (Step B11). Next, the control section 1 performs processing for setting the slide operation flag F to "2" (Step 1312), and returns to above-described Step B2. Here, if the movement of the finger or the like is still in the stopped state (NO at Step B2 and YES at Step B7), the control section 1 proceeds to above-described Step B8. However, in this case, the slide operation flag F is "2" (NO at Step B8), and therefore the control section 1 returns directly to the above-described Step 32, and continues the clocking operation of the stop timer.

Then, when the finger or the like resumes sliding after temporarily stopping (YES at Step B2), the control section 1 judges at above-described Step B3 that the judgment result is NO, and after proceeding to subsequent Step B13, judges whether or not the slide operation flag F is "2". Here, since it is a case where the finger or the like has resumed sliding after having temporarily stopped, the slide operation flag F is "2" (YES at Step B13). Therefore, the control section 1 stops the clocking operation of the stop timer, and stores the measured amount of time in the work area of the storage section 3, as stop duration (Step B14).

Then, after performing processing for setting the slide operation flag F to "3" to indicate that the latter slide movement has started (Step B15), the control section 1 returns to above-described Step B2. At Step B2, when judged that the slide movement is still being made (YES at Step B2), the control section 1 judges at above-described Step B3 that the judgment result is NO, and proceeds to above-described Step B13. Then, since the slide operation flag F is not "2" (NO at Step B13), the control section 1 proceeds to subsequent Step B16, and judges whether or not the slide operation flag F is "3". Here, if the slide operation flag F is not "3" (NO at Step B16), the control section 1 proceeds to Step B28 in FIG. 8, and determines that the slide operation does not correspond to any of the slide operations of the predetermined patterns, as a determination result of the slide-operation determination processing.

However, in this case, the slide operation flag F is "3" (YES at Step B16), and therefore the control section 1 stores the current touch position and movement direction in the work area of the storage section 3 (Step B17). Next, the control section 1 judges whether or not the slide movement is being made substantially linearly, based on the movement direction (Step B18). When judged that the slide movement is not being made substantially linearly (NO at Step B18), since this slide operation does not correspond to any of the slide operations of the predetermined patterns shown in FIG. 2A to FIG. 3B, the control section 1 proceeds to Step B19 and sets the value of the slide operation flag F to "0". Next, the control section 1 then proceeds to Step B28 in FIG. 8, and determines that the slide operation does not correspond to any of the slide operations of the predetermined patterns, as a determination result of the slide-operation determination processing. Conversely, when judged that the initial slide movement is being made substantially linearly (YES at Step B18 in FIG. 7), the control section 1 returns to the above-described Step B2.

Here, when the finger or the like is removed from the touch sensor 8, and the control section 1 detects that the slide movement has ended (NO at Step B2 and NO at Step B7), the control section 1 proceeds to Step B20 in FIG. 8, and judges whether or not the slide operation flag F is "3". Here, if the slide operation flag F is not "3" (NO at Step B20), the control section 1 proceeds to Step B28 and determines that the slide operation does not correspond to any of the slide operations of the predetermined patterns, as a determination result of the slide-operation determination processing. However, since it is a case where a touch operation has ended after a latter slide movement, the slide operation flag F is "3" (YES at Step B20), and therefore the control section 1 performs processing for calculating the movement amount of the latter slide movement based on each touch position in the latter slide movement which has been stored in the work area of the storage section 3, and storing the movement amount in the work area of the storage section 3 (Step B21). In addition, the control section 1 performs processing for calculating the movement speed of the latter slide movement and storing the movement speed in the work area of the storage section 3 (Step B22).

Then, the control section 1 compares the movement direction of the initial slide movement and the movement direction of the latter slide movement to judge which of the slide operations of the predetermined patterns shown in FIG. 2A to FIG. 3B corresponds to the pattern of the current slide operation. Specifically, the control section 1 judges whether or not they are having an opposite-direction relationship (Step S23), whether or not they are having a 90° forward-rotation direction relationship (Step B24), and whether or not they are having a 90° counter-rotation direction relationship (Step B25).

When judged that the initial slide movement and the latter slide movement are having an opposite-direction relationship (YES at Step B23), a 90° forward-rotation direction relationship (YES at Step B24), or a 90° counter-rotation direction relationship, the control section 1 proceeds to Step B26, and performs processing for storing the type of the slide-operation pattern in the work area of the storage section 3. Then, the control section 1 determines that the slide operation corresponds to one of the slide operations of the predetermined patterns, as a determination result of the slide-operation determination processing (Step B27). Conversely, when judged that the initial slide movement and the latter slide movement are not having any of the relationships (NO at Step B23 to Step B25), since the slide operation is not any of the slide operations of the predetermined patterns shown in FIG. 2A to FIG. 3B, the control section 1 determines that the slide operation does not correspond to the slide operations of the predetermined patterns (Step B28).

When the slide-operation determination processing is completed as described above (Step A4 in FIG. 6), the control section 1 judges whether or not the slide operation corresponds to the slide operations of the predetermined patterns shown in FIG. 2A to FIG. 3B, based on the result of the determination processing. When judged that the slide operation does not correspond to these slide operations (NO at Step A5), the control section 1 performs processing based on this operation, as processing other than image scrolling (Step A3). Conversely, when judged that the slide operation corresponds to these slide operations (YES at Step A5), the control section 1 acquires the slide state of the slide operation (slide operation pattern, movement amount and movement speed of each slide movement, and duration of temporary stop) from the work area of the storage section 3 (Step A6).

Then, the control section 1 references the setting table T3 (Step A7) and judges whether or not there is a setting corresponding to the slide state (Step A8). When judged that there is no corresponding setting (NO at Step A8), the control section 1 performs processing based on this operation, as processing other than image scrolling (Step A3). Conversely, when judged that there is a corresponding setting (YES at Step A8), the control section 1 accesses the control table T1 based on this setting, accesses the control table T1 based on "A" to "D" in the "details" field read out from the slide table T2 in association with the slide-state type, and performs the corresponding display control processing (Step A9).

For example, in the setting example (1) of the setting table T3 shown in FIG. 5A, "1" has been set in the "setting ID" field corresponding to "amount of initial movement in opposite direction". Accordingly, when the slide-operation pattern is a slide-operation pattern in which an initial slide movement direction and the latter slide movement direction are having an opposite-direction relationship, the number of images to be scrolled is "3 images" if the amount of the initial movement in the opposite direction is "C". In addition, "2" has been set in the "setting ID" field corresponding to "speed of latter movement in forward direction". Accordingly, when the speed of the latter movement in the forward direction is "B", the image-scrolling speed is "2 sec/image". Moreover, "3" has been set in the "setting ID" field corresponding to "stop duration during direction change". Accordingly, when the stop duration during the direction change is "B", the image-switching effect during the image scrolling is "slide-in". Furthermore, "4" has been set in the "setting ID" field corresponding to "amount of initial movement in 90° forward-rotation direction". Accordingly, when the slide operation pattern is a slide-operation pattern in which an initial slide movement direction and the latter slide movement direction are having a 90° forward-rotation direction relationship, the image-scrolling unit is "head-of-folder only" if the amount of the initial movement in the 90° forward-rotation direction is "C".

In the setting example (2), "1" has been set in the "setting ID" field corresponding to "amount of initial movement in opposite direction". Accordingly, when the amount of the initial movement in the opposite direction is "A", the number of images to be scrolled is "1 image". In addition, "2" has been set in the "setting ID" field corresponding to "amount of latter movement in forward direction". Accordingly, when the amount of the latter movement in the forward direction is "B", the image-scrolling speed is "2 sec/image". Moreover, "3" has been set in the "setting ID" field corresponding to "stop duration during direction change". Accordingly, when the stop duration during the direction change is "A", the image-switching effect during the image scrolling is "none".

Also, "4" has been set in the "setting ID" field corresponding to "amount of initial movement in 90° counter-rotation direction". Accordingly, when the amount of the initial movement in the 90° counter-rotation direction is "D", the image-scrolling unit is "earliest-timestamp-of-day only". In this instance, among a series of images being managed in units of days, only images having the earliest time (earliest timestamp) of each day are read out, and sequentially scrolled. When the image-scrolling unit is "Head-of-folder only", and a series of images have been discretely stored in a plurality of folders, only images stored in the head position of each folder are read out as predetermined images, and sequentially scrolled.

As described above, when a slide operation is performed in which a finger or the like is moved on the touch sensor 8 while touching it, and the pattern of the slide operation determined based on its movement directions is a pattern in which the finger or the like is initially moved in one direction, and after being temporarily stopped, moved in a different direction, the control section 1 of the present embodiment controls display content being displayed on the display section 7, based on the combination of the initial movement direction and the latter movement direction. Accordingly, in the present embodiment, various control through a simple operation can be performed when display content is controlled based on a touch operation, whereby the user-friendliness and the operability are enhanced. Therefore, it is practically useful.

In addition, the slide-operation pattern of the present embodiment is a pattern in which a finger or the like is initially moved substantially linearly in one direction, and after being temporarily stopped, moved substantially linearly in a different direction. Therefore, the slide operation of the present embodiment is an easy and simple operation that is performed linearly.

Moreover, the direction of an initial movement is opposite to a direction (display control direction) in which control is performed on display content displayed on the display section 7, and the direction of the subsequent latter movement is the direction in which control is performed on the display content. Therefore, the slide operation of the present embodiment is an easy and simple operation that reflects a display control direction.

Furthermore, the direction of an initial movement is substantially perpendicular to a display control direction, and the direction of the subsequent latter movement is the display control direction. Therefore, the slide operation of the present embodiment is an easy and simple operation that reflects a display control direction. Note that "substantially perpendicular direction" herein indicates that, even if the movement direction of the finger or the like slightly changes during its slide movement, the movement is recognized as an initial movement as long as it is substantially perpendicular to the display control direction as a whole. Accordingly, there may be angular errors or shaking in movement to the extent that a person skilled in the art can recognize the direction as being almost perpendicular.

Still further, when the pattern of a slide operation is a pattern in which a finger or the like is initially moved in one direction, and after being temporarily stopped, moved in a different direction, display control is performed based further on the initial movement amount or the subsequent latter movement amount. Therefore, in the present embodiment, movement amount can be included in the parameters as a slide state, whereby more various display control can be actualized.

Yet still further, when the pattern of a slide operation is a pattern in which a finger or the like is initially moved in one direction, and after being temporarily stopped, moved in a different direction, display control is performed based further on the initial movement speed or the subsequent latter movement speed. Therefore, movement speed can also be included in the parameters as a slide state, whereby more various display control can be actualized.

Yet still further, when an operation is performed in which a finger or the like is initially moved in one direction, and after being temporarily stopped, moved in a different direction, display control is performed based on the stop duration. Therefore, the stop duration of a temporary stop can also be included in the parameters as a slide state, whereby more various display control can be actualized.

Yet still further, image scrolling is performed in a direction based on a slide operation. Therefore, the direction of image scrolling can be changed by a simple operation.

Yet still further, image scrolling is performed per number of images based on a slide operation. Therefore, the number of images to be scrolled can be changed by a simple operation.

Yet still further, image scrolling is performed at a speed based on a slide operation. Therefore, image-scrolling speed can be changed by a simple operation.

Yet still further, a display effect that is inserted during image scrolling can be changed based on a slide operation. Therefore, the type of effect to be added during image scrolling can be changed by a simple operation.

Yet still further, the type of image-scrolling unit can be changed based on a slide operation. Therefore, the type of image-scrolling unit can be changed by a simple operation.

Yet still further, among a series of images which have been discretely stored in a plurality of folders, only a predetermined image (head image) of each folder is read out and the type of image-scrolling unit is changed. Therefore, the type of image-scrolling unit can be changed by a simple operation.

Yet still further, among a series of images stored with a timestamp attached thereto, only images to which a predetermined timestamp (earliest timestamp) is attached are read out and the type of image-scrolling unit is changed. Accordingly, by this configuration as well, the type of image-scrolling unit can be changed by a simple operation.

In the above-described embodiment, image scrolling is given as an example of display control. However, the present invention can be similarly applied to page scrolling by which text data and the like are scrolled in units of pages. In this case, "1 image", "2 images", "3 images", and "4 images" in the control table T1 are respectively changed to "1 page", "2 pages", "3 pages", and "4 pages", and "1 sec/image", "2 sec/image", "3 sec/image", and "4 sec/image" are respectively changed to "1 sec/page", "2 sec/page", "3 sec/page", and "4 sec/page". In addition, the display control is not limited to image scrolling or page scrolling, and may include image enlargement and reduction, screen scrolling, etc.

Moreover, the patterns of slide operations in which display control can be performed are not limited to the operation patterns shown in FIG. 2A to FIG. 3B, and can be determined arbitrarily. Furthermore, the slide operation of the present invention is not limited to a substantially linear movement, and may be an arc-shaped slide movement, etc. Also, the slide operation is not limited to an initial slide movement and a latter slide movement, and may include three slide movements.

Still further, although display content displayed on the display section 7 constituting the touch panel 6 is controlled in the above-described embodiment, display content displayed on the screen of a display section provided separately, a mobile phone serving as an external device, or the like connected to the digital camera may be controlled.

Yet still further, in the above-described embodiment, the present invention has been applied to a digital camera. However, the present invention may be applied to a mobile phone, a personal digital assistant (PDA), a music player, a personal computer, and the like.

Furthermore, the "device" and the "sections" described in the above-described embodiment are not required to be in a single casing, and may be separated into a plurality of casings by function. In addition, the steps in the above-described flowcharts are not required to be processed in time series, and may be processed in parallel, or individually and independently.

While the present invention has been described with reference to the preferred embodiments, it is intended that the invention be not limited by any of the details of the description therein but includes all the embodiments which fall within the scope of the appended claims.

What is claimed is:

1. An electronic device comprising:
   a touch-input section which detects a touch operation;
   a display section;
   a movement detecting section which detects movement directions of a slide operation on the touch-input section while touching the touch-input section, when the slide operation is performed;
   a pattern determining section which determines a pattern of the slide operation based on the movement directions detected by the movement detecting section, wherein the pattern determining section is configured to detect a predetermined pattern in which the touch operation is performed in an order of (i) movement in a first direction and (ii) movement in a second direction that differs from the first direction, wherein the pattern determining section is further configured to determine a combination corresponding to the predetermined pattern from among a plurality of predetermined combinations for the first direction and the second direction;
   a display control section which controls a direction of changing display content displayed on the display section and controls a type of a method of changing the display content based on the combination determined by the pattern determining section; and
   a measuring section which measures a stop duration of a temporary stop, when the predetermined pattern of the slide operation is a pattern in which the touch operation is performed in an order of (i) the movement in the first direction, (ii) the temporary stop, and (iii) the movement in the second direction that differs from the first direction,
   wherein the display control section further controls the display content displayed on the display section such that another type of the method of changing the display content is controlled based on the stop duration measured by the measuring section.

2. The electronic device according to claim 1, wherein the first direction and the second direction are substantially linear.

3. The electronic device according to claim 1, wherein the first direction is opposite to a direction in which the display content displayed on the display section is controlled, and the second direction is the direction in which the display content displayed on the display section is controlled.

4. The electronic device according to claim 1, wherein the first direction is substantially perpendicular to a direction in which the display content displayed on the display section is controlled, and the second direction is the direction in which the display content displayed on the display section is controlled.

5. The electronic device according to claim 1, wherein the movement detecting section further detects movement amounts of the slide operation; and
   wherein the display control section controls the display content displayed on the display section based on a movement amount in the first direction or a movement amount in the second direction detected by the movement detecting section.

6. The electronic device according to claim 1, wherein the movement detecting section further detects movement speeds of the slide operation; and
   wherein the display control section controls the display content displayed on the display section based on a movement speed in the first direction or a movement speed in the second direction detected by the movement detecting section.

7. The electronic device according to claim 1, wherein the display content displayed on the display section is content including a plurality of images or pages; and
   wherein the display control section performs image or page scrolling in a direction based on the predetermined pattern of the slide operation, as control of the display content.

8. The electronic device according to claim 1, wherein the display content displayed on the display section is content including a plurality of images or pages; and
   wherein the display control section performs image or page scrolling per number of images or pages corresponding to the predetermined pattern of the slide operation, as control of the display content.

9. The electronic device according to claim 1, wherein the display content displayed on the display section is content including a plurality of images or pages; and
   wherein the display control section performs image or page scrolling at a speed corresponding to the predetermined pattern of the slide operation, as control of the display content.

10. The electronic device according to claim 1, wherein the display content displayed on the display section is content including a plurality of images or pages; and
    wherein the display control section changes a display effect inserted during image or page scrolling based on the predetermined pattern of the slide operation, when performing the image or page scrolling as control of the display content.

11. The electronic device according to claim 1, wherein the display content displayed on the display section is content including a plurality of images or pages; and
    wherein the display control section changes a type of image-scrolling unit or page-scrolling unit based on the predetermined pattern of the slide operation, when performing image or page scrolling as control of the display content.

12. The electronic device according to claim 11, wherein the display content displayed on the display section is content composed of the plurality of images; and
    wherein the display control section reads out, among a series of images discretely stored in a plurality of folders, only a predetermined image from each folder to change the type of image-scrolling unit.

13. The electronic device according to claim 11, wherein the display content displayed on the display section is content composed of the plurality of images; and
    wherein the display control section reads out, among images stored with a timestamp attached thereto, only images to which a predetermined timestamp has been attached to change the type of image-scrolling unit.

14. The electronic device according to claim 1, wherein the first direction includes a plurality of directions.

15. The electronic device according to claim 14, wherein the second direction includes a plurality of directions that differ from a corresponding one of the plurality of directions included in the first direction.

16. The electronic device according to claim 1, wherein a combination of the first direction and the second direction which differs from the first direction is arbitrarily settable with respect to a plurality of types of display control.

17. The electronic device according to claim 1, wherein with respect to the combination corresponding to the predetermined pattern, a content of display control to be performed by the display control section is arbitrarily settable.

18. A non-transitory computer-readable storage medium having stored thereon a program that is executable by a computer, the program being executable by the computer to perform functions comprising:

processing for detecting movement directions of a slide operation on a touch-input section while touching the touch-input section, when the slide operation is performed;

processing for determining a pattern of the slide operation based on the detected movement directions, wherein a predetermined pattern is detectable in which a touch operation is performed in an order of (i) movement in a first direction and (ii) movement in a second direction that differs from the first direction, and wherein a combination corresponding to the predetermined pattern is determinable from among a plurality of predetermined combinations for the first direction and the second direction;

processing for controlling a direction of changing display content displayed on a display section and controlling a type of a method of changing the display content based on the determined combination; and processing for measuring a stop duration of a temporary stop, when the predetermined pattern of the slide operation is a pattern in which the touch operation is performed in an order of (i) the movement in the first direction, (ii) the temporary stop, and (iii) the movement in the second direction that differs from the first direction, wherein the display content displayed on the display section is further controlled such that another type of the method of changing the display content is controlled based on the measured stop duration.

* * * * *